United States Patent
Daniel (10) Patent No.: US 9,201,976 B1
(45) Date of Patent: Dec. 1, 2015

(54) SYSTEM AND METHOD OF AUTHENTICATING AN IMMIGRATION VISA CARD HOLDER USING AN INTERACTIVE IMMIGRATION CARD

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 0 days.

(21) Appl. No.: 14/188,394

(22) Filed: Feb. 24, 2014

Related U.S. Application Data (63) Continuation-in-part of application No. 61/768,213, filed on Feb. 22, 2013.

(51) Int. Cl.
*G06F 17/30* (2006.01)
*G06K 19/06* (2006.01)

(52) U.S. Cl.
CPC ...... *G06F 17/30882* (2013.01); *G06F 17/3005* (2013.01); *G06K 19/06046* (2013.01)

(58) Field of Classification Search
CPC ................... G06F 17/30882; G06F 17/30879; G06K 19/06046
USPC ........................................................ 235/380
See application file for complete search history.

(56) References Cited

U.S. PATENT DOCUMENTS

| | | | |
|---|---|---|---|
| 2013/0128060 A1* | 5/2013 | Rhoads et al. | 348/207.1 |
| 2014/0035720 A1* | 2/2014 | Chapman | 340/5.51 |
| 2014/0079281 A1* | 3/2014 | Williams et al. | 382/103 |
| 2014/0214547 A1* | 7/2014 | Signorelli et al. | 705/14.64 |

* cited by examiner

*Primary Examiner* — Thien T Mai
*Assistant Examiner* — Toan Ly
(74) *Attorney, Agent, or Firm* — Carol N. Green Kaul, Esq.

(57) ABSTRACT

The present invention relates generally to a system and method of interactive verification of an immigration card holder's identity. Specifically, by using an electronic immigration card with a coded frame displayed thereon that includes one or more hot corners with one or more hyperlinks or icons embedded within the coded frame, that is activated for display when image capturing means scans the coded frame. Upon activation, a hyperlink or icon may be engaged for controlling interactive multimedia content pursuant to a control command associated with the one icon or hyperlink. The multimedia content may include authenticating information, e.g. security questions, a photograph and the like. Because the interactive multimedia content is not visible prior to the coded frame being scanned, the immigration card has varied layers of securing the information electronically stored thereon.

24 Claims, 10 Drawing Sheets

SYSTEM AND METHOD OF AUTHENTICATING AN IMMIGRATION VISA CARD HOLDER USING AN INTERACTIVE IMMIGRATION CARD

PRIORITY CLAIM

The present application claims priority to, and is a Continuation in Part of U.S. Provisional Patent Application Ser. No. 61/768,213 titled: "A System And Method Of Authenticating Using an Interactive Immigration Visa Card," filed Feb. 22, 2013. The entire disclosure of said patent application is incorporated herein by reference.

FIELD OF THE INVENTION

The present invention relates generally to a system and method of interactive verification of an immigration card holder's identity. Specifically, by using an electronic immigration card with a coded frame displayed thereon that includes one or more hot corners with one or more hyperlinks or icons embedded within the coded frame, that is activated for display when image capturing means scans the coded frame. Upon activation, a hyperlink or icon may be engaged for controlling interactive multimedia content pursuant to a control command associated with the one icon or hyperlink. The multimedia content may include authenticating information, e.g. security questions, a photograph and the like. Because the interactive multimedia content is not visible prior to the coded frame being scanned, the immigration card has varied layers of securing the information electronically stored thereon.

DESCRIPTION OF THE PRIOR ART

Many immigrants chose to travel to foreign countries for several reasons, political asylum, financial opportunities, and religious freedom to name a few. For countries that issue immigration cards as required documentation for foreigners entering or exiting the country several of these immigration cards have a simplistic security system where the information is encoded on the immigration card in a barcode and/or stored on a magnetic stripe on the back of the card and the remaining information is easily duplicated. Immigration and customs authorities over the years have improved on the photographs and other indicia of ownership that are displayed on the immigration card with the hope that the cards are difficult to duplicate. Nonetheless, fraudulent immigration cards are still not fully eradicated and there still exists a need for a more sophisticated technology where the information stored on the immigration card is not obvious therefore difficult, if not impossible to duplicate. This invention satisfies these long felt needs in a new and novel manner and solves the foregoing problems that the prior art has been unable to resolve. For a further and more fully detailed understanding of the present invention, various objects and advantages thereof, reference is made to the following detailed description and the accompanying drawings.

Additional objectives of the present invention will appear as the description proceeds. The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Apparatus

Figure 1A:
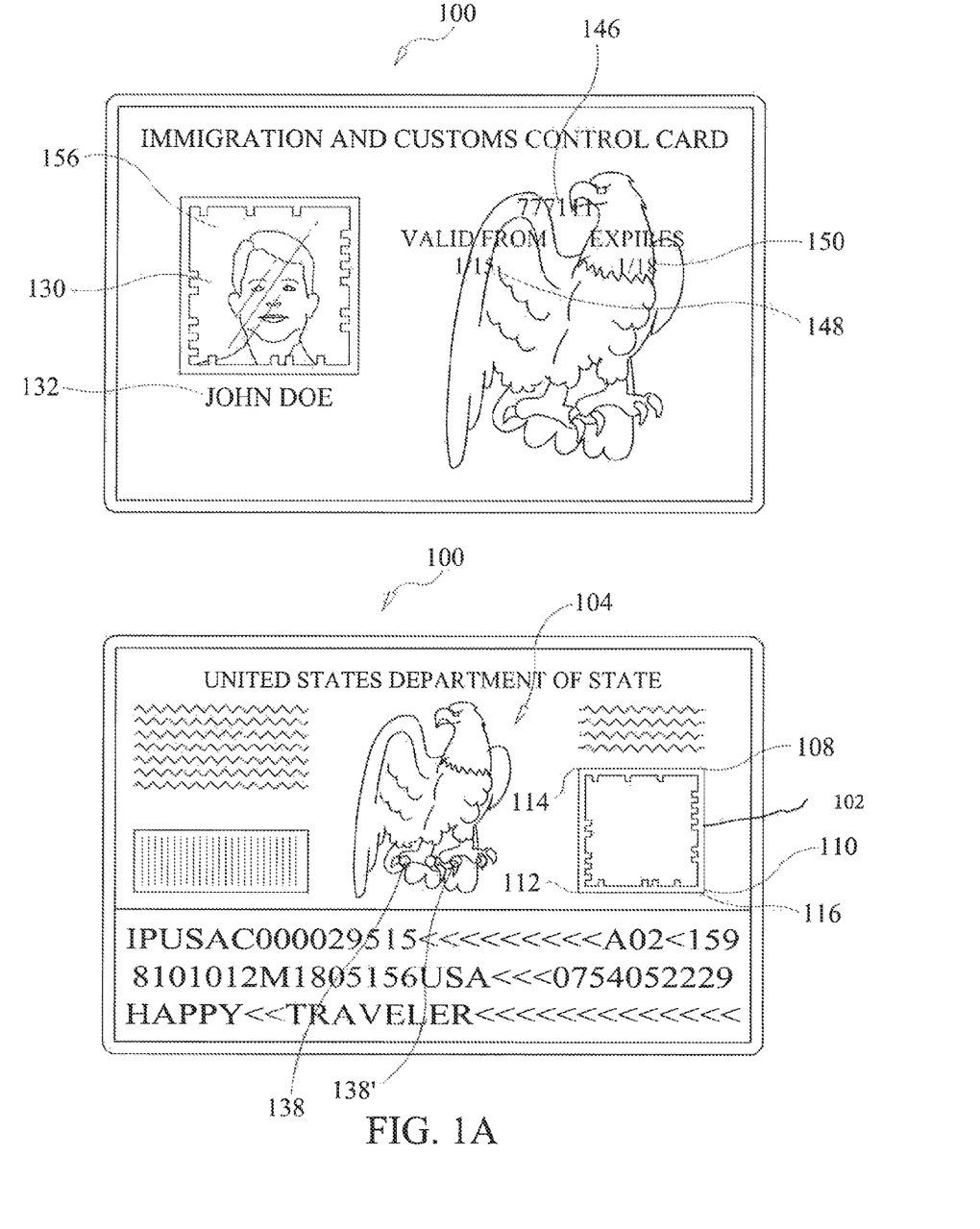
FIGS. 1A-1C are exemplary embodiments of the apparatus of the invention.
Figure 1B:
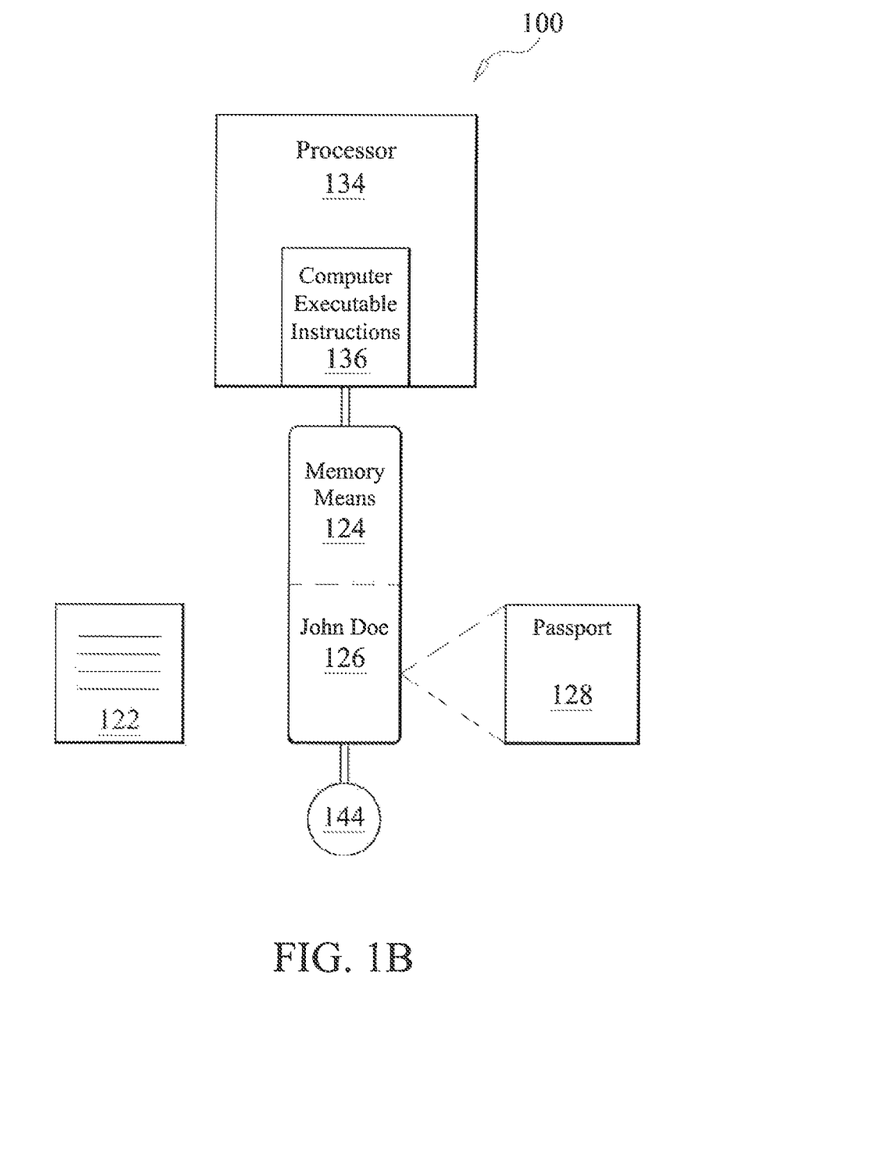
Figure 1C:
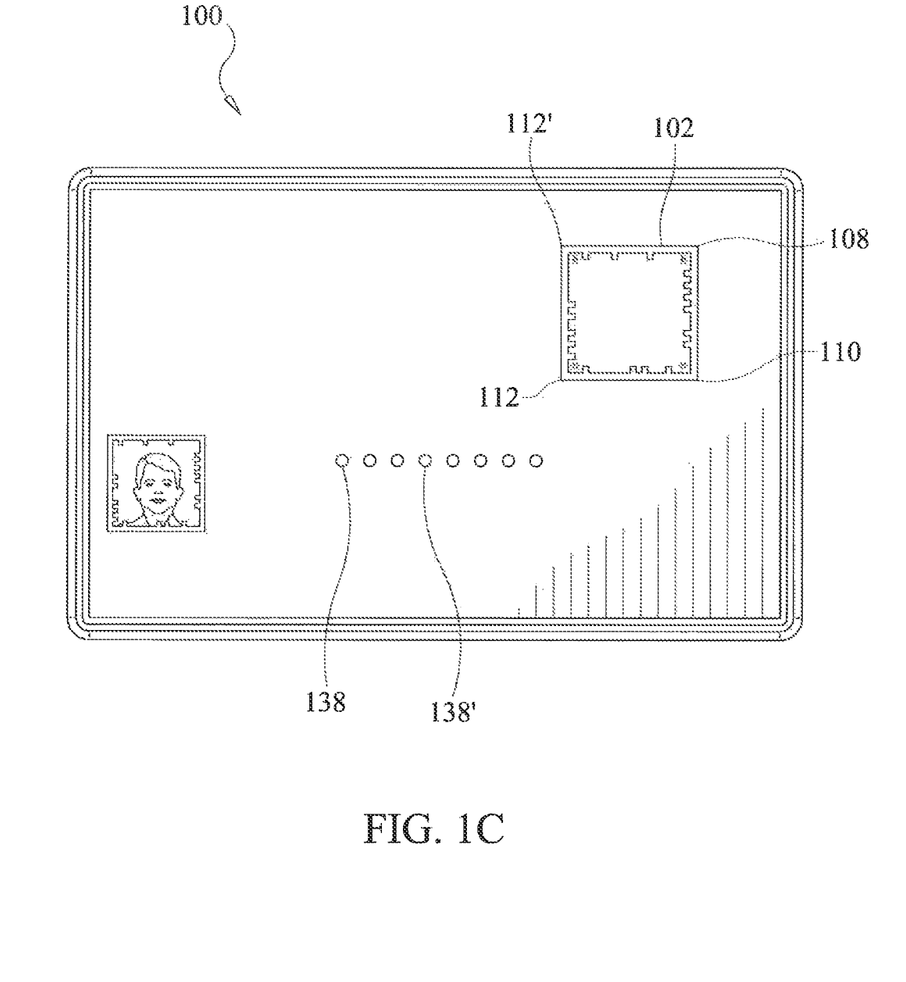

FIGS. 1A, 1B & 1C are exemplary embodiments of an apparatus 100 of the invention. Apparatus 100 comprises of an immigration card 100 used for documenting cardholder's authorization to travel to foreign countries with at least one electronically coded frame 102 displayed on the immigration card's exterior 104 that includes cardholder's customs information 106 as entered by an issuing government agency, wherein the coded frame 102 includes at least one or more hot corners 108, 110, 112 with at least one or more hyperlinks 114, 114' or icons 116, 116' embedded within the coded frame 102, wherein the at least one or more hot corners 108, 110, 112 with at least one or more hyperlinks 114, 114' or icons 116, 116' are activated for display when image capturing means 118 scans the coded frame 102 and the embedded hyperlinks 114, 114' or icons 116, 116' become visible for engagement. Upon activation, the at least one hyperlink 114 or icon 116 may be engaged for accessing and controlling multimedia content 120 pertaining to the cardholder's customs information 106 using at least one or more control commands 122, 122' associated with the at least one hyperlink 114 or icon 116 by overlaying the coded frame 102 with the at least one hyperlink 114 or icon 116. Multimedia content 120 may include but is not limited to any one or more of the following: customs information, agency bulletin, agency authentication information, warnings, identification verification information, visa authorization, or security questions. Multimedia content 120 may be displayed in any one or more of the following formats: graphics, pictorial, video, audio or text and/or any combination thereof.

Immigration card 100 is selected from the group of electronic devices consisting essentially of programmable smart cards, memory cards, and processor cards, with at least one memory means 124 positioned therein. Customs information 106 as used herein includes any one or more of the following: passport information 128, declaration of goods, declaration of foreign countries visited, purpose for visit to foreign countries visited within a certain period of time, and purpose for visit and any other information that the issuing embassy may deem significant enough to store on the immigration card 102. Passport information 128 includes but is not limited to: photograph 130, issuing country, passport number, given names 132, address, nationality, date of birth, place of birth, gender, race, height, color of eyes, passport number, date of issue, passport expiration date, occupation, place of issue, authority, contact information, current visa information, type of visa, visa restrictions or endorsement.

Immigration card 100 may or may not include a processor 134 positioned within. If it includes a processor 134, which may be any type of processor 134, such as, but not limited to, a central processing unit (CPU), a microprocessor, a video processor, a front end processor, a coprocessor, a single-core processor, a multi-core processor, as well as any known processor 134 that is used in the arts.

As shown in FIG. 1B, in some embodiments, embedded within the processor 134 are computer executable instructions 136 readable and executable by the card's at least one processor 134 where the computer executable instructions 136 are operative to perform the varied system and methods disclosed herein including but not limited to: retrieving the cardholder's customs information 106; or retrieving multimedia content 120 pursuant to scanning a coded frame 102 that includes at least one or more hot corners 108, 110, 112, with at least one embedded hyperlink 114 or icon 116 embedded within, and the like. Computer executable instructions 136 may be loaded directly on the card's processor 134, or may be stored in its memory means 124, that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 136 may be any type of computer executable instructions 136, which may be in the form of a computer program, the program being composed in any suitable programming language or source code, such as C++, C, JAVA, JavaScript, HTML, XML, and other programming languages.

In some embodiments, immigration card 100 includes at least one memory means 124 as exemplified in FIG. 1B. Such memory means 124 may include a hardware component, e.g. storage hardware, in electrical communication with at least one processor 134. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 124 may comprise of both hardware and software components.

Figure 2:
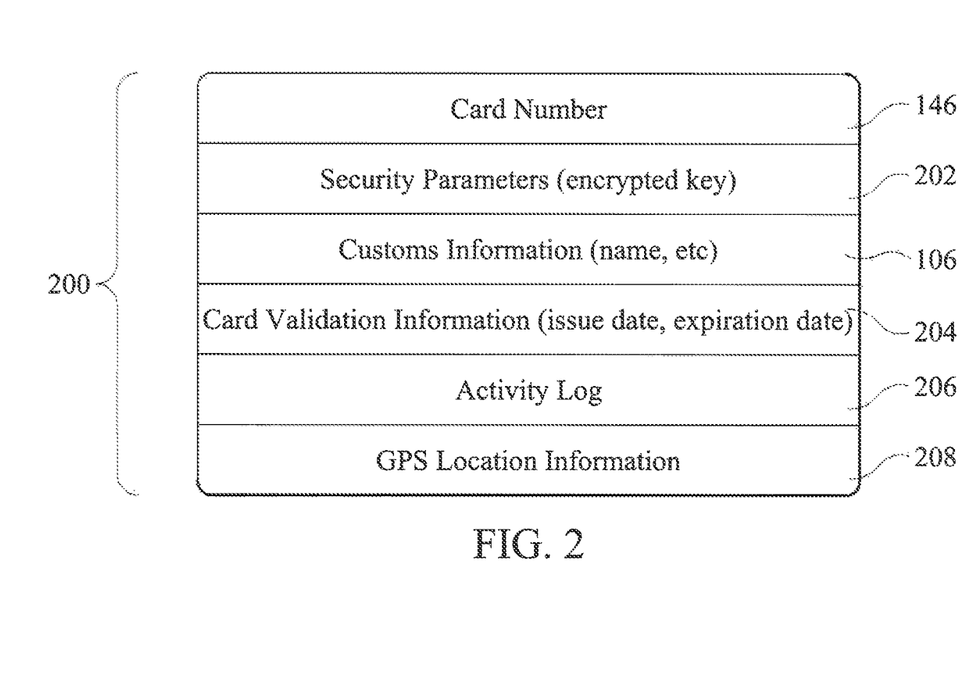
FIG. 2 is an exemplary embodiment of the data structures of the invention.

Memory means 124 may include any one or more of the following stored thereon: customs information 106, and/or any other data structures 200 (as shown in FIG. 2), multimedia content 120, hyperlinks 114, 114', website addresses or Uniform Resource Locators (URLs), and the like. In some embodiments, at least one memory means 124 may be embedded within at least one processor 134 where the information stored therein is encrypted for privacy purposes. In other embodiments, the at least one memory means 124 is adapted with electrical contacts 138, 138' for establishing wired and/or wireless connectivity with external devices, e.g. a computer 140 and/or a card reader 142 and/or at least one microprocessor 134 where the memory means 124 is embedded within.

In some embodiments, immigration card 100 may optionally include a battery 140, which serves as a power source for the at least one processor 134 positioned therein. In some embodiment, immigration card 100 is adapted with external electrical contacts 138, 138' for establishing wired and/or wireless connectivity to a card reader 142 or a charger, e.g. a docking station, and as such may not include a battery 144. In that event, processor 134 detects when the immigration card 100 has been disconnected from an external power source and switches immigration card's power source to an internal power source, such as the battery 144.

Referring back to FIG. 1A, immigration card 100 may include a card number 146, which acts as a unique identifier for the immigration card 100 and/or cardholder. Card number 146 may be assigned by a random number generating program, comprising of numerals, characters, alphanumeric characters or any other unique identifiers that are known and used in the arts. Card number 146 may be assigned using portions of cardholder's social security number or any other customary assignment for immigration card numbers that are known and used in the arts and/or to be created. Prior to being issued to the cardholder, the card number 146 may be recorded by the issuing embassy as another means of identifying the cardholder. Immigration card 100 may also include other indicia of identification, e.g. the immigration cardholder's name 132. In some embodiments, the cardholder's address may be stored within the immigration card's memory means 124. Each immigration card 100 has an issue date 144 that corresponds to the date the immigration card 100 was issued to the traveler, and/or the card's 102 expiration date 150, which corresponds to the date the immigration card 100 expires and is no longer valid.

Immigration card 100 may include external electrical contacts 138, 138' for making electrical contact with a card reader 142. In some embodiments, the immigration card 100 includes a bar code 152 on the immigration card's exterior 104 encoded with travel authorization information. Accordingly, when the immigration card 100 is swiped through a card reader 142 at a customs border at a port of entry, the customs verification application software 154 retrieves the customs information 106.

In some embodiments, the immigration card 100 includes an image 156 within the coded frame 102 adding an additional level of complexity to their security measures for the immigration card 100. Image 156 may be the cardholder's photograph, country's emblem or other any other immigration and customs appropriate image 156. As such, a fraudulent duplication necessitates that not only the image 156 within the coded frame 102 must be accurately duplicated but also the corresponding embedded hyperlinks 114, 114' and/or icons 116, 116' embedded within the coded frame 102 in order to access accurate undisplayed multimedia content 120 that remains invisible until activated after being scanned by image capturing means 118 and engaged using the hyperlinks 114, 114' and/or icons 116, 116'. As shown the coded frame 102 is a square but it is understood that the coded frame 102 could've been any other geometrical shape that is generally used in the arts for frames.

FIG. 2 illustrates, by way of example, collectively the data structures 200 stored within an embodiment of the immigration card 100. Data structures 200 are retained within the electronic data card's memory means 124, which preferably provides sufficient processing resources to facilitate communication and maintain adequate security for the card 102. Data structures 200 may include but is not limited to: card number 146, security parameters 202, customs information 106, card validation information 204, activity log 206, and Global Positioning System ("GPS") location information 208. Card number 146 may act as a unique identifier allowing the system to uniquely recognize and register each immigration card 100 that has been assigned and issued to individual travelers. Security parameters 202 may be provided, that may include an encrypted key(s) of military grade, and or security codes, biometric security features, and/or other security mechanisms.

Customs information 106 may include but is not limited to: passport information 128, declaration of goods, declaration of foreign countries visited, purpose for visit to foreign countries visited within a certain period of time, and purpose for visit and the like. Passport information 128 for the traveler may be stored thereon, which include but is not limited to photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), and type of visa and the like. It will be understood that access to the passport information 128 may be provided in a hierarchical form associated with security provisions to protect the information stored on the immigration card 100.

Card validation information 204 may include for example issue date 148 that corresponds to the date the immigration card 100 was issued to the traveler, and/or the card's 100 expiration date 150. Activity log 206 may optionally contain a record of all uses of the immigration card 100, e.g. countries for which the immigration card 100 was presented as a means of pre-determining traveler's authorized entry status to different countries.

In some embodiments, the immigration card 100 may include GPS location determining means 210 (not shown), e.g. a GPS transponder, for determining the location of the immigration card 100 with means for encoding 212 (not shown) the location into an electronic signal using e.g. a microprocessor 134, which is transmitted to an authorized institution where the transmitted electronic signal is decoded and the location of the immigration card 100 or use activity may be monitored in real-time. Therefore, the location of the immigration card 100 and as such the location of the traveler may be determined in real-time via global satellite system, where the information, i.e. the longitude and latitude coordinates, may be stored in the GPS location information 208.

Systems & Methods

FIGS. 3A-3D are exemplary embodiments of the system 300 of the invention. System 300 comprises of an immigration card 100 used for travel authorization with at least one electronically coded frame 102 displayed on the immigration card's exterior 104 that includes embedded cardholder's customs information 106 entered by an issuing government agency, wherein the coded frame 102 includes at least one or more hot corners 108, 110, 112 with at least one or more hyperlinks 114, 114' or icons 116, 116' embedded within the coded frame 102, and wherein the at least one or more hot corners 108, 110, 112, 112' with at least one or more hyperlinks 114, 114' or icons 116, 116' are activated for display by scanning the coded frame 102 with image capturing means 118 where the embedded hyperlinks 114, 114' or icons 116, 116' become visible for engagement. Upon activation, the activated at least one hyperlink 114 or icon 116 may be engaged for accessing and controlling corresponding multimedia content 120 pertaining to the cardholder's customs information 106 using at least one control command 122 associated with the activated at least one hyperlink 114 or icon 116 by overlaying the coded frame 102 with the engaged at least one hyperlink 114 or icon 116. As previously mentioned, in some embodiments, the immigration card 100 includes an image 156 within the coded frame 102, which may include the cardholder's photograph, country's emblem or other any other appropriate image 156.

Figure 3A:
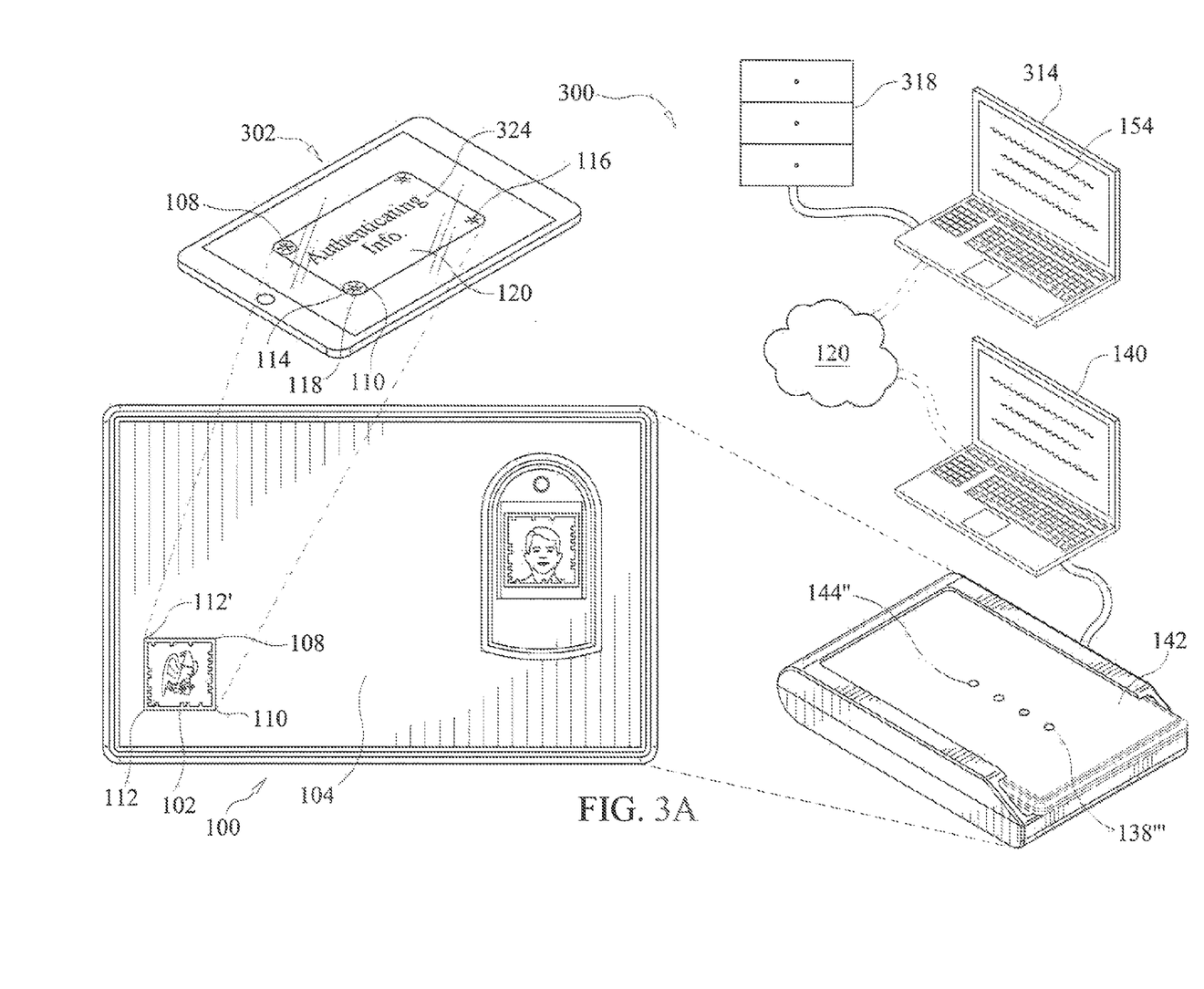
FIGS. 3A-3D show an example of the system of the invention.
Figure 3B:
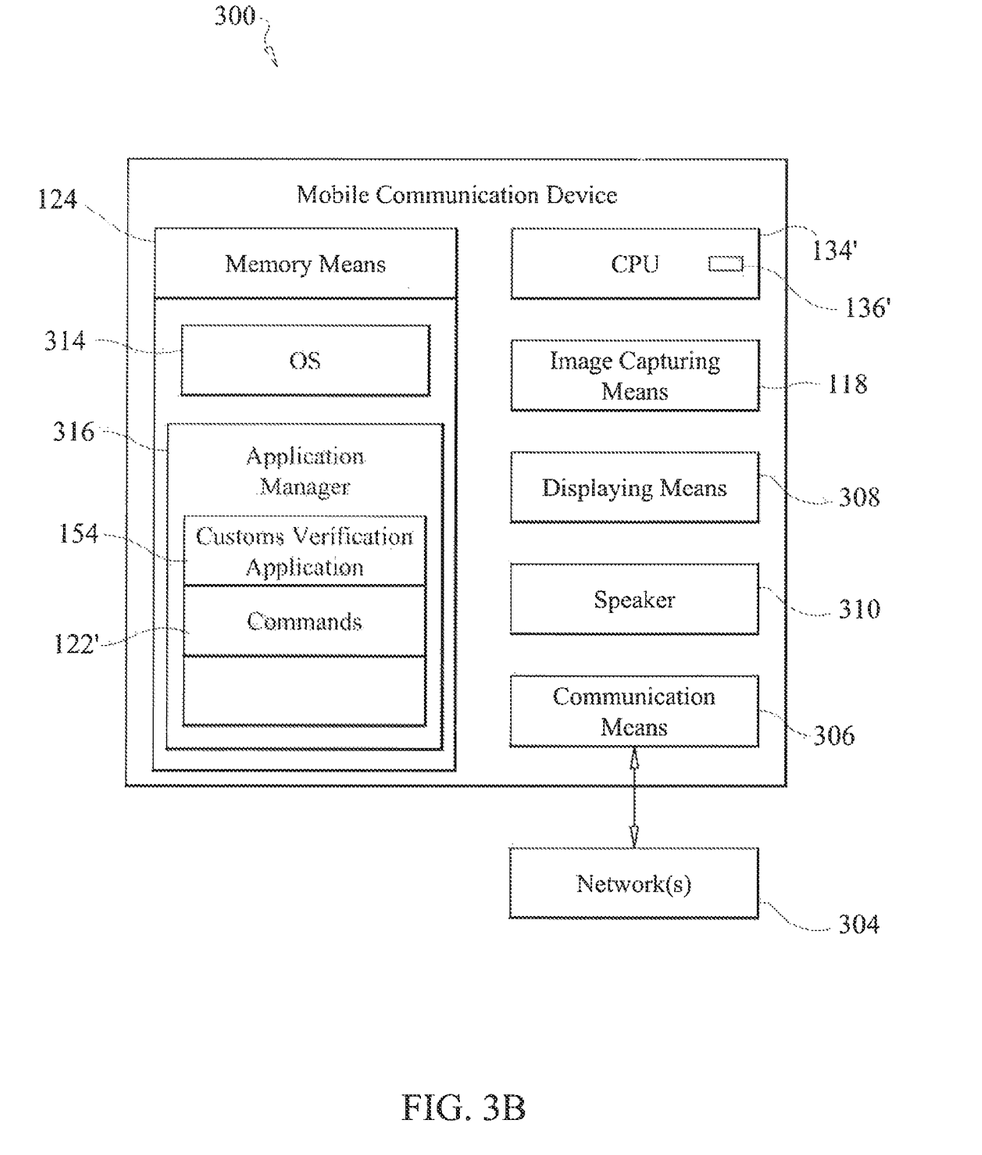

System 300 also includes a networked communication device 302 as shown in FIG. 3B that comprises of at least one computer processor 134', a non-transitory computer readable medium connected to the at least one processor 134' that includes comprising computer executable instructions 136' readable and executable by the computer processor 134' and configured for launching a customs verification application program 150, programmed for controlling the multimedia content 120; the image capturing means 118; and displaying means 308 for displaying the at least one multimedia content 120.

Networked communication device 302 may be any type of electronic computerized communication device configured with means for communicating wirelessly and/or wired with other electronic computer devices, and includes but is not limited to, a computerized scanner, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 304, local area network 304, wide area network 304, such as the Internet 304, or any other type of network device that can communicate over a network 304. Computer 140 as used herein includes but is not limited to a network enabled computer 140, cellular phones like the networked communication device 302 described herein, a laptop or personal digital assistant subject to wired/wireless connectivity and configured with a computer processor 134.

Networked communication device 302 may include various other hardware components, e.g. memory means 124', and one or more communication means 306 and also software components like the customs verification app 154. The networked communication device's central processor 134' may be programmed to activate the customs verification app 154, e.g. running in background while the networked communication device 302 is powered on, for viewing multimedia contents 120, 120', which may be displayed on the networked communication device's displaying means 308 in for example graphics, pictorial, video, audio, text format or any combination thereof.

In some embodiments, the customs verification app 154 may have its own computer icon 116 or other visual indicator displayed on the networked communication device 302 for launching or providing access to the customs verification app 154. When a merchant selects the respective interactive customs verification app's icon 116 (e.g. by touching a touchscreen, or selecting it using a pointing device, roller ball, arrow keys, or other controller), where upon selection, the computer central processor 134' launches the customs verification app 154 and the networked communication device's processor 134', which is electronically connected to the displaying means 308, controls the displaying means 308 to display the customs verification app 154 as launched on the at least one networked communication device's displaying means 308. Once displayed the customs verification app 154 is ready for use in scanning the coded frame 102, or the image 156 within the coded frame 102 on the immigration card 100.

Networked communication device's one or more memory means 124' may be either electrically or mechanically connected to the at least one computer processor 134'. Information stored on the networked communication device's memory means 124' may be retrieved using its processor 134' and may be published by push notification on the networked communication device's displaying means 308 or broadcasted over a speaker 310 using the type and configuration of speakers that are well known and used in the arts for cellular phones 304, 304'.

Networked communication device 302 is equipped with communication means 306, either electrically or mechanically connected to the central processor 134'. In the case of electronic connections, the electronic connections may be wired and/or wireless. In some embodiments, communication means 306 may be a wireless communication means 306, which employ short range wireless protocol, such as, but not limited to, a radio frequency transceiver, a radio frequency receiver, and/or a radio frequency transmitter for communicating over the Internet 304 to access for example issuing embassy's websites, other designated URLs and their corresponding multimedia content 120. It is understood that each coded frame 102 is unique, even if the multimedia content 120 is not.

In embodiments where the wireless communication means 306 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 306 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 306 is operative to transmit or receive electronic communications, i.e. the captured at least one image 156, the coded frame 102, the multimedia content 120, electronic data, audio, videos, text, pictures, graphics and the like via a short range wireless protocol, such as, but not limited to, a radio frequency receiver, a radio frequency transmitter, or a radio frequency transceiver and to communicate and search for the appropriate hyperlink, websites, URLs and the like over the Internet 304.

Networked communication device 302 includes a computer processor 134', disposed within and in electronic communication with the memory means 124'. Computer processor 134' includes computer executable instructions 136' readable and executable by the at least one processor 134'. Computer executable instructions 136' are operative to perform all the necessary functions for the networked communication device 302, including but not limited to: automatically launching the customs verification app 154, i.e. running a background service while the networked communication device 302 is powered on, and controlling multimedia content 120 corresponding to the coded frame 102 or at least one image 156 within the coded frame 102, which include at least one or more hot corners 108, 110, 112' with at least one embedded hyperlink 114 or icon 116 within, and the like. The computer executable instructions 136' may be stored on any type of non-transitory or transitory computer readable medium, e.g. the networked communication device's processor 134' or memory means 124'. Memory means 124 include but is not limited to, computer readable media, such as, but not limited to, a hard drive, a solid state drive, a flash memory, random access memory, CD-ROM, CD-R, CD-RW, DVD-ROM, DVD-R, DVD-RW, and the like.

Customs verification app 154, which may be stored in the networked communication device's memory means 124' also comprises of computer executable instructions 136" readable and executable by the at least one processor 134', and is configured for performing any all the necessary functions for the system 100 and methods of the invention, which may include any one or more of the following: controlling multimedia content 120 corresponding to the coded frame 102 and/or the at least one image 156 within the coded frame 102, where the coded frame 102 includes at least one or more hot corners 108, 110, 112' with at least one embedded hyperlink 114 or icon 116 within, responsive to the control command 302 associated with the hyperlink 114 or icon 116 in the hot corner 118; activating the at least one or more hot corners 108, 110, 112, 112" when the at least one image 156 within the coded frame 102 is scanned. Customs verification app 154 is also configured for playing the at least one multimedia content 120 for the coded frame 102 or the captured at least one image 156 within the coded frame 102 pursuant to a control command 302 associated with the at least one embedded icon 116 or hyperlink 114; receiving at least one control command 302 for activating the at least one multimedia content 120 within the coded frame 114 with full functionality for review and control when the multimedia content 120 is for instance displayed. Control command 302 as used herein include but are not limited to any one or more of the following: play, stop, fast-forward, rewind, pause, maximize viewing, minimize, end and cancel; retrieving the at least one multimedia content 120, e.g. a security questions, customs information 106, agency bulletin, agency authentication information, warnings, passport information 128 (some or partial), visa authorization, visa restrictions, and the like, which is retrieved by linking to a website using a designated URL and the like. The at least one control command 302' associated with the at least one embedded icon 116 includes any one of the following: display multimedia content 120, play audio for multimedia content 120, link to an electronic address and the like.

Figure 3C:
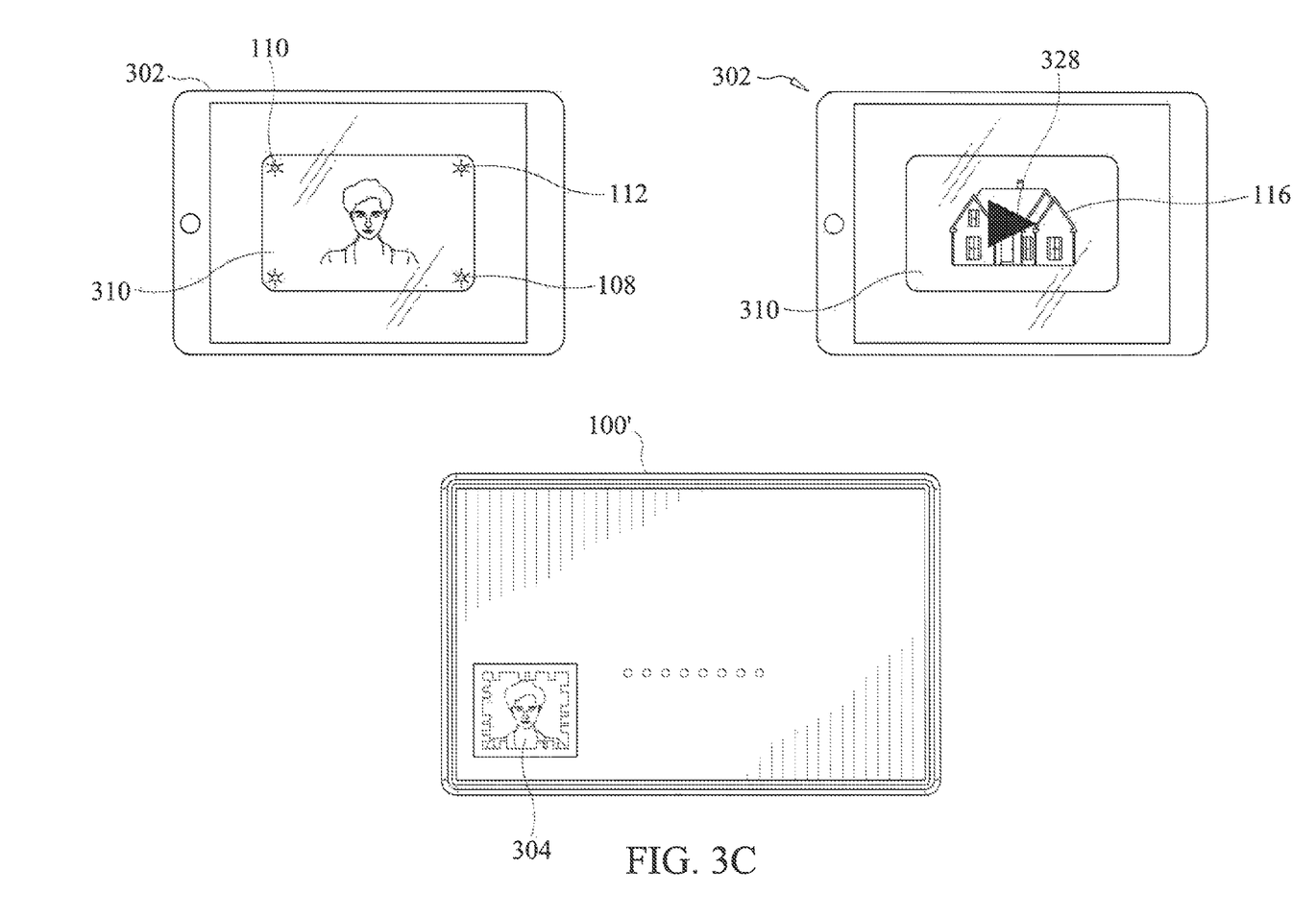
Figure 3D:
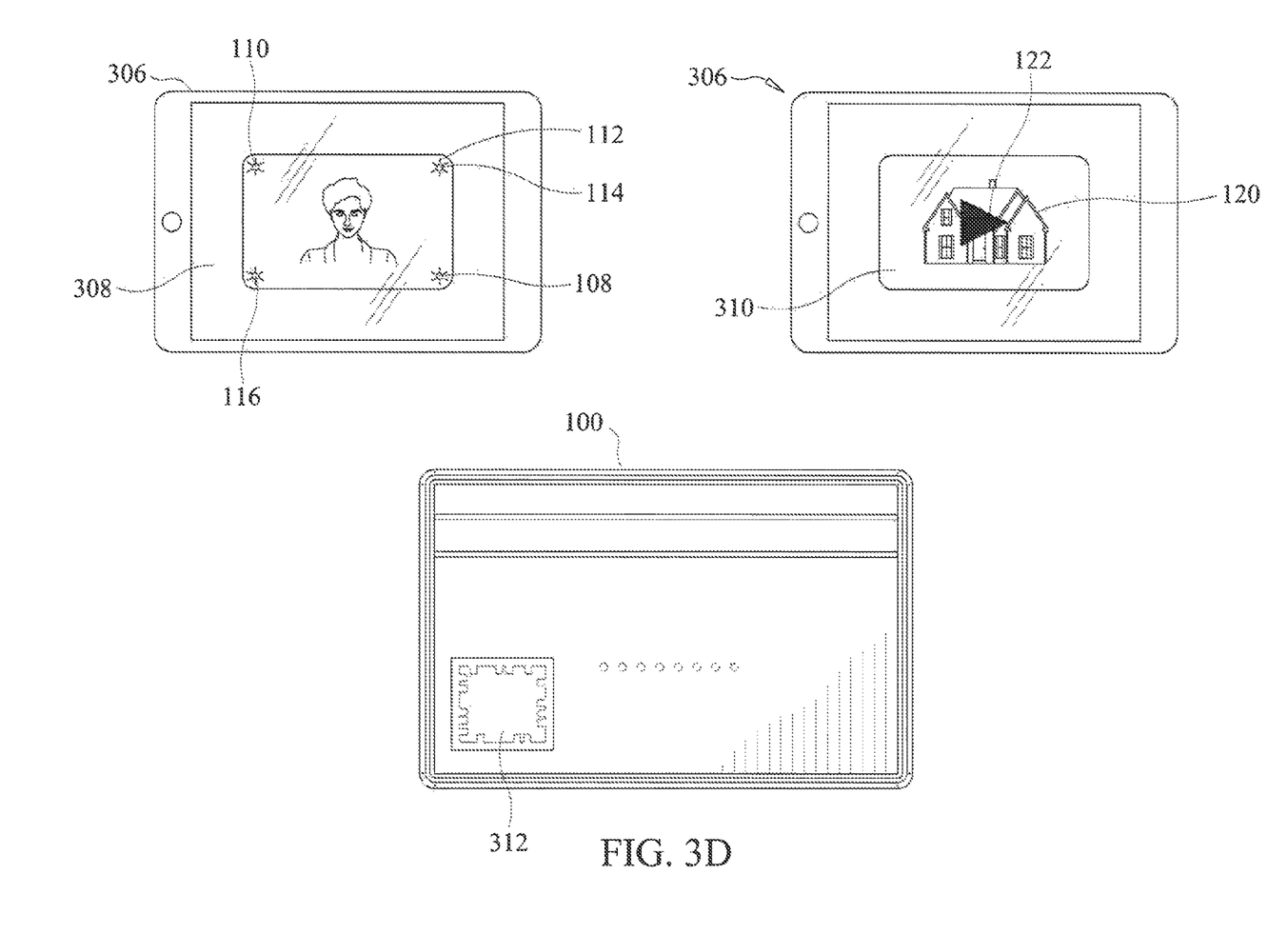

In some embodiments, as shown in FIGS. 3C & 3D, the immigration card 100 includes an image 156, where the customs verification app 154 is configured for controlling the multimedia content 120 corresponding to the at least one image 156 within the coded frame 102 by overlaying the at least one image 156 with the at least one embedded icon 116, and the associated control command 302 controls the multimedia content 120.

In some embodiments, the immigration card 100 does not include an image 156. As such, the customs verification app 154 is configured for controlling the multimedia content 120 corresponding to the coded frame 102 by overlaying the designated display area 312 with the at least one embedded icon 116, which has an associated control command 302 for controlling the multimedia content 120 as displayed on the displaying means 308.

Networked communication device 302 may include any kind of displaying means 308, such as, but not limited to: a liquid crystal display ("LCD") screen, a light emitting diode ("LED") display, touchpad or touch screen display, and/or any other means known in the arts for emitting a visually perceptible output. Networked communication device's processor 134' is in electronic communication with its displaying means 308 and may be wirelessly connected to processor 134'. Displaying means 308 may include control means, such as, but not limited to, a touch screen, a stylus, and the like that may be used to also control or input values or interact with the multimedia content 120, e.g. responding to security questions. In some embodiments, displaying means 308 may be electronically connected to a networked communication device 302 according to the hardware and software protocols that are known and used in the arts. Computer central processor 134 controls the networked communication device's displaying means 308, which is configured for displaying the at least one or more coded advertising images 114, multimedia contents 120, 120' and the like.

Networked communication device 302 also includes software components that may be stored in the memory means 124'. Memory means 124' may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by networked communication device 302. Networked communication device 302 may also contain an input element for inputting data and an output element for displaying data.

Also stored on the memory means 124' may be an operating system 314, application manager 316, and the customs verification app 154. Customs verification app 154 may be an independent component or may be incorporated into the operating system 314. Customs verification app 154 is a computer-executable component, readable and executable by the computer processor 134, wherein the customs verification app 154 links to the Internet 304 to retrieve at least one or more multimedia contents 120, 120' to be displayed on the networked communication device's displaying means 308. The multimedia contents 120, 120' may be in any format, e.g. audio, video, pictorial, text message, graphics, and as such is published or also broadcasted in any format on the networked communication device 302.

Application manager 316 comprises of computer-executable components that operate in the networked communication device 302 and may be implemented in a variety of ways. In one embodiment of the invention, application manager 316 may use one or more computer-executable components for interacting with customs verification app 154. In another embodiment, customs verification app 154 is incorporated in application manager 316 to receive information from the input element, to communicate with, and/or to control the operations of customs verification app 154.

Customs verification app 154 may comprise in part of a browser, such as for use on the networked communication device 302, or a similar browsing device. Customs verification app 154 may be any type of software application, such as a standalone application designed to run on a mobile platform, such as a networked communication device running an operating system 314, such as iOS™, Android™, Windows Mobile™, Blackberry™, and the like. Customs verification app 154 may be operative for an iPhone, any other "smart phone," networked communication device, cellular phone, PDA, GPS or any other networked communication device 302 capable of handling electronic transactions dealing with dynamic content, object, application, or software. In some embodiments, the customs verification app 154 may be designed to run on a social network platform, such as FACEBOOK® or JUSTSYNC®, and the like. In some embodiments, customs verification app 154 may reside on a server computer 140 and may be downloadable from the server computer 140, the server computer's electronic database 326 or otherwise reside in the networked communication device's local memory means 124'. For example, in one embodiment, the customs verification app 154 may be on a networked communication device 302 (such as an iPhone, Blackberry, or other "smart phone") and the full-sized software program may be on a computer 140, where communications may occur over a network 304 or directly, either wired or wirelessly.

Referring back to FIGS. 3C & 3D, the networked communication device 302 may be used to scan the coded frame 102 and/or the image 156 within the coded frame 102 on the immigration card 100 for verification of the user's identity. For example, a merchant may use image capturing means 118, e.g. a networked communication device's camera, to scan or hover over the coded frame 102 and/or any image 156 activating the undisplayed, embedded at least one hyperlink 114 or icon 116. Once the coded frame 102 and/or the image 156 is scanned the at least one or more hot corners 108, 110, 112, 112" with the at least one hyperlink 114 or icon 116 are activated and viewable to be engaged for controlling interactive multimedia content 120 pursuant to a control command 302 associated with the at least one icon 116 or hyperlink 114 in the at least one hot corner 108. The activated at least one or more hot corners 108, 110, 112, 112" or icons 116, 116' may pulsate, blink or displayed in a color contrast or animated to alert the user of the option to interact with the hot corners 108, 110, 112, 112" and/or the icons 116, 116' by exploring one or more of the interactive control commands 130, 130' associated with the icons 116, 116'. In some embodiments, the control commands 302, 302' also become viewable and are displayed when the hot corners 108, 110, 112, 112" or icons 116, 116' are activated.

The icons 116, 116' or hyperlinks 114, 114' may be engaged on the networked communication device's displaying means 308 by overlaying the image 156 or the designated display area 312 within the coded frame 102 with at least one icon 116, which causes the customs verification app 154 to retrieve the multimedia content 120. The interactive multimedia content 120 may be stored on the immigration card's memory means 124, the remote computer server 136' or linked to a website or other URL, where the multimedia content 120 may remain dynamic. Multimedia content 120 includes passport information 128 such that if the immigration card 100 is a fake, since the passport information 128 that may be stored thereon is coded and viewable when scanned by a third-party merchant's communication device 302, the immigration and customs agent is able to verify the information and quickly determine whether the immigration card 100 and/or the cardholder's is authorized for travel. For the security questions, such security questions may comprise of a randomly generated sequence based on the cardholder's known information with the issuing embassy, whereby the questions being posed are dynamic and may differ every time.

In some embodiments, once the networked communication device's image capturing means 118 hovers over the coded frame 102, it causes the application software 154 to automatically display the multimedia content 120 that is associated with the coded frame 102. In some embodiments of the invention, the app 308 includes virtual radio buttons 320, 320' that may allow the user to further manipulate the image, e.g. play, rewind, fast forward, scroll text, or stop the video 320 being played. As such, the app 308 makes a determination of whether a corresponding multimedia content 120 exists; conducts at least one electronic computerized search for the corresponding multimedia content 120 to the extent that the multimedia content 120 exists; retrieves the multimedia content 120 for the coded frame 102 and/or the image 156; and display the multimedia content 120 on the networked communication device's displaying means 114.

As seen in FIG. 3A, system 300 further comprises of a card reader 142 connected to a computer 140, wherein the card reader 142 is configured for reading the immigration card 100 for verifying the cardholder's authorization for travel using the interactive immigration card 100. Card reader 142 describes an electronic device for scanning and reading electronic data cards, e.g. the immigration card 100 via the exemplary bar code 148, to obtain electronic data stored thereon as are well known and used in the arts. Card reader 142 is connected to a computer 140 either wirelessly or wired, wherein card reader 142 is configured for scanning and reading any one or more of the following: the card number 146, the customs information 106, and/or any other component of the data structures 300 stored thereon. Card reader 142 is further configured for reading or writing to the immigration card 100. Card reader 142 as exemplified herein may be adapted with electrical contacts 134", 134''' for establishing wired and/or wireless connectivity to immigration cards 100, 100', 100" and/or the computer 140 and transmits that card number 146 to the computer 140, where the immigration card 100 is authenticated as a validly issued card. In some embodiments, a wireless connection may be established, wherein communication access is established with the computer 140 or the immigration card 100 in response to proximity or manual activation of the card reader 142. Card reader 142 may also be integrated within a computer 140 (e.g. with a slot for wired card connectivity), an external device (e.g., USB connection to a small housing), or be integrated into other devices.

Methods

Figure 4:
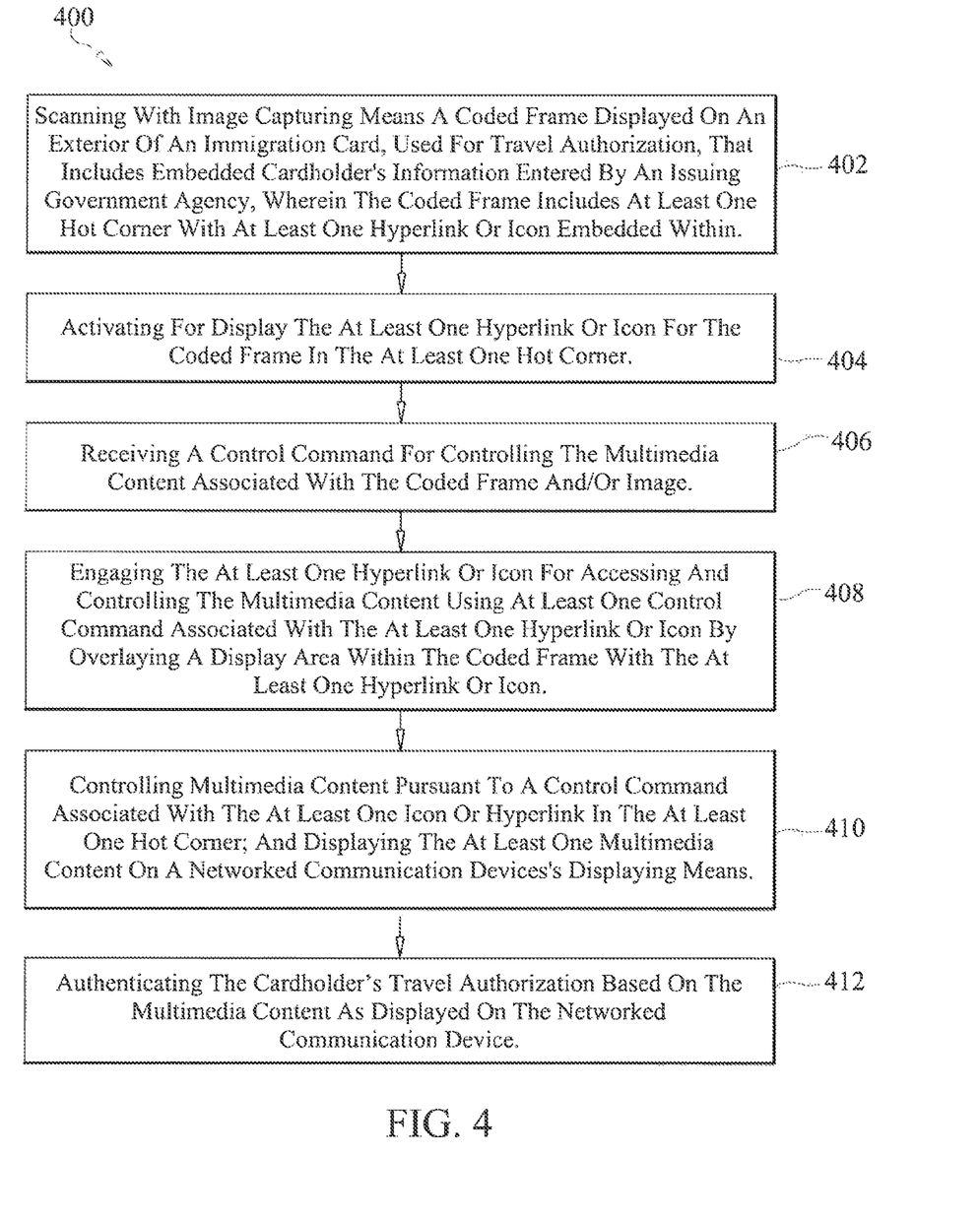
FIG. 4 shows an example of the method of the invention.

FIG. 4 shows an example of an exemplary method 400 according to one embodiment. Method 400 comprises of scanning with the networked communication device's image capturing means 118 a coded frame 102 displayed on an electronic immigration card 100 used for travel authorization, that includes embedded cardholder's customs information 106 entered by an issuing government agency that is electronically stored thereon, and wherein the coded frame 102 includes at least one or more hot corners 108, 110, 112, 112" with at least one hyperlink 114 or icon 116 embedded within (step 402).

Method 400 further comprises activating for display the at least one hyperlink 114 or icon 116 for the coded frame 102 or an image 156 in the at least one hot corner 112 (step 404); engaging the at least one hyperlink 114 or icon 116 for accessing and controlling the multimedia content 120 by overlaying a display area 312 within the coded frame 102 with the at least one hyperlink 114 or icon 116 (step 406). By overlaying the display area 312 or the image 156 the at least one hyperlink 114 or icon 116 are activated and may pulsate, blink or displayed in a color contrast or animated to alert the user of the option to interact with the hot corners 108, 110, 112, 112" and/or the icons 116, 116' by exploring one or more of the interactive control commands 130, 130' associated with the icons 116, 116'.

Method 400 further comprises receiving a control command 122 for controlling the multimedia content 120 associated with the coded frame 102 and/or image 156 (step 408) wherein the customs verification app 154 retrieves the multimedia content 120 for display (step 410) from any one or more of the following sources: electronic database 326, the immigration card's memory means 124, hyperlinking to a Uniform Resource Locator or any other electronic address designated by the issuing government agency.

Method 400 further comprises controlling the multimedia content 120 pursuant to a control command 302 associated with the at least one icon 116 or hyperlink 114 in the at least one hot corner 108 (step 408); and displaying the at least one multimedia content 120 on a networked communication device's displaying means 308 (step 410). The multimedia content 120 includes any one or more of the following: Multimedia content 120 may include but is not limited to any one or more of the following: customs information, agency bulletin, agency authentication information, warnings, identification verification information, visa authorization, visa restrictions, or questions. Multimedia content 120 may be displayed in any one or more of the following formats: video, text, graphics, and audio, or any combination thereof.

In some embodiments, the multimedia content 120 may include a security question for which the immigration cardholder needs to answer correctly in order to gain entry or clearance for exit or entrance to a country's borders. Method 400 further comprises authenticating the immigration cardholder's identity based on the multimedia content 120 displayed on the networked communication device 302 pursuant to being retrieved by the customs verification app 154 upon scanning the coded frame 102. For example, the multimedia content 120 may include security question(s) or a photograph that may be used to verify the cardholder's identity s either the cardholder will need to answer the security questions accurately and/or the retrieved photograph 120 needs to match the immigration and customs' records. The multimedia content 120 may be displayed within the coded frame 102 or in some embodiments is not confined to the coded frame 102 as displayed on the displaying means 308 but will display to fit a displayable area on the networked communication mean's displaying means 308. In either event, the multimedia content 120 may be controlled with full functionality for review and control using the control command 302 associated with the at least one embedded icon 116 or hyperlink 114 that has been activated and engaged. Such control command 122 associated with the at least one at least one hyperlink 114 or icon 116 includes any one of the following: display multimedia content 120, link to government agency's website, or another designated website.

Hardware and Operating Environment

This section provides an overview of example hardware and the operating environments in conjunction with which embodiments of the inventive subject matter can be implemented.

A software program may be launched from a computer readable medium in computer-based systems 100-300 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
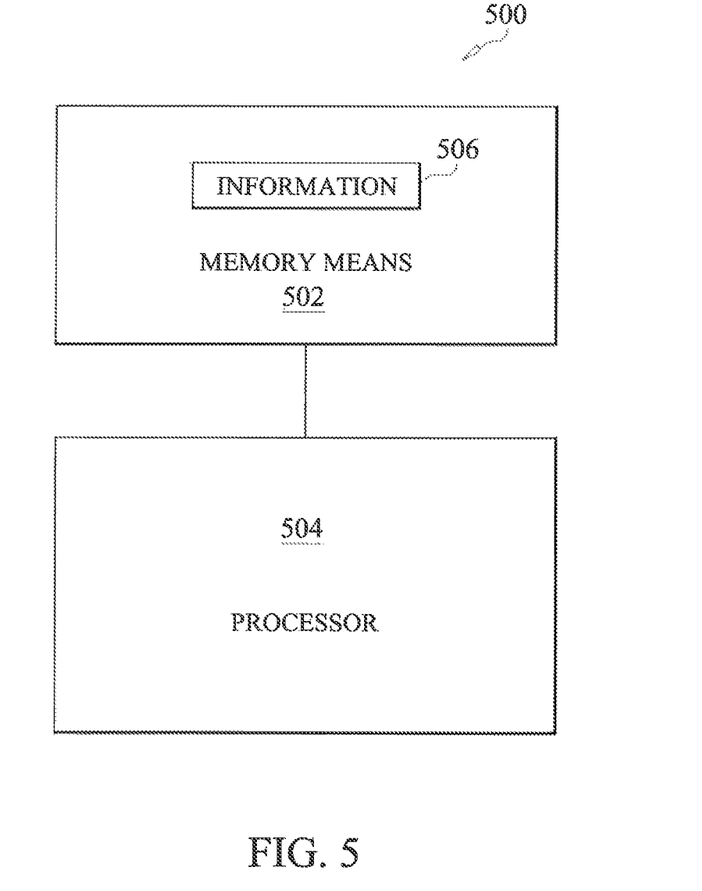
FIG. 5 is a block diagram representing an apparatus according to various embodiments.

FIG. 5 is a block diagram representing an apparatus 500 according to various embodiments. Such embodiments may comprise a computer, a memory system, a magnetic or optical disk, some other storage device, or any type of electronic device or system. The apparatus 500 may include one or more processor(s) 502 coupled to a machine-accessible medium such as a memory 504 (e.g., a memory including electrical, optical, or electromagnetic elements). The medium may contain associated information 506 (e.g., computer program instructions, data, or both) which, when accessed, results in a machine (e.g., the processor(s) 504) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An apparatus comprising of an immigration card with at least one coded frame displayed on the immigration card's exterior that includes embedded cardholder's information entered by an issuing government agency, wherein the cardholder's information is activated for display on a display means by scanning the coded frame that includes at least one hyperlink or icon embedded within, with image capturing means and upon activation, the activated at least one hyperlink or icon becomes visible and may be engaged for accessing and controlling corresponding multimedia content using at least one control command associated with the at least one hyperlink or icon by overlaying an image or a designated display area on the display means, with the activated at least one hyperlink or icon.

2. The apparatus of claim 1, further comprising an image displayed within the coded frame.

3. The apparatus of claim 2, wherein the image comprising any one of the following: cardholder's photograph or country's emblem.

4. The apparatus of claim 2, wherein the at least one multimedia content may be displayed in any one or more of the following formats: graphics, pictorial, video, audio, or text.

5. The apparatus of claim 1, wherein the at least one multimedia content includes any one or more of the following: customs information, agency bulletin, agency authentication information, warnings, identification verification information, visa authorization, visa restrictions, or questions.

6. The apparatus of claim 1, wherein a customs verification application is further configured for displaying on the display means the at least one multimedia content within the coded frame with functionality for review and control using the control commands.

7. The apparatus of claim 1, wherein at least one control command associated with the at least one at least one hyperlink or icon includes any one of the following: display multimedia content, link to government agency's website, or link to a designated website.

8. A system comprising:
an immigration card with at least one coded frame displayed on the immigration card's exterior that includes embedded cardholder's information entered by an issuing government agency, wherein the cardholder's information is activated for display on a display means, by scanning the coded frame that includes at least one hyperlink or icon embedded within, with image capturing means and upon activation, the activated at least one hyperlink or icon becomes visible and may be engaged for accessing and controlling corresponding multimedia content using at least one control command associated with the at least one hyperlink or icon by overlaying an image or a designated display area on the display means with the activated at least one hyperlink or icon; and
a networked communication device comprising:
a computer processor, a non-transitory computer readable medium connected to the at least one processor that includes computer executable instructions stored on the non-transitory computer readable medium executable by the computer processor and configured for launching a customs verification application program, programmed for controlling the multimedia content;
the image capturing means; and
the displaying means for displaying the at least one multimedia content.

9. The system of claim 8, further comprising an image displayed within the coded frame.

10. The system of claim 8, wherein the at least one multimedia content includes any one or more of the following: customs information, agency bulletin, agency authentication information, warnings, identification verification information, visa authorization, visa restrictions, or questions.

11. The system of claim 8, wherein the at least one multimedia content may be displayed in any one or more of the following formats: graphics, pictorial, video, audio, or text.

12. The system of claim 8, wherein the customs verification application is further configured for displaying the at least one multimedia content within the coded frame with functionality for review and control using the control commands.

13. The system of claim 8, wherein at least one control command associated with the at least one at least one hyperlink or icon includes any one of the following: display multimedia content, link to government agency's website, or link to a designated website.

14. The system of claim 8, wherein the customs verification application is further configured for displaying the at least one multimedia content within the coded frame with functionality for review and control.

15. The system of claim 8, wherein the customs verification application is further configured for retrieving the at least one multimedia content by linking to a website.

16. A method comprising:
scanning with image capturing means a coded frame, which includes at least one hyperlink or icon embedded within, displayed on an exterior of an immigration card, used for travel authorization, that includes embedded cardholder's information;

activating for display the at least one hyperlink or icon for the coded frame wherein the activated at least one hyperlink or icon becomes visible;

receiving a control command for controlling the multimedia content associated with the coded frame and/or image;

engaging the at least one hyperlink or icon for accessing and controlling the multimedia content using at least one control command associated with the at least one hyperlink or icon by overlaying a display area within the coded frame with the at least one hyperlink or icon;

controlling multimedia content pursuant to a control command associated with the at least one icon or hyperlink in the at least one hot corner; and displaying the at least one multimedia content on a networked communication device's displaying means.

17. The method of claim 16, further comprising authenticating the cardholder's travel authorization based on the multimedia content as displayed on the networked communication device.

18. The method of claim 16, wherein the immigration card further comprises an image displayed within the coded frame.

19. The method of claim 16, wherein the at least one multimedia content includes any one or more of the following: customs information, agency bulletin, agency authentication information, warnings, identification verification information, visa authorization, visa restrictions, or questions.

20. The method of claim 16, wherein the at least one multimedia content may be displayed in any one or more of the following formats: video, text, graphics, and audio.

21. The method of claim 16, wherein the customs verification application is further configured for displaying the at least one multimedia content within the coded frame with functionality for review and control using the control commands.

22. The method of claim 16, wherein at least one control command associated with the at least one at least one hyperlink or icon includes any one of the following: display multimedia content, link to government agency's website, or link to a designated website.

23. The method of claim 16, wherein the customs verification application is further configured for displaying the at least one multimedia content within the coded frame with functionality for review and control.

24. The method of claim 16, wherein the customs verification app is further configured for retrieving the at least one multimedia content by linking to a website.

* * * * *